United States Patent [19]

Hirai et al.

[11] 4,246,619
[45] Jan. 20, 1981

[54] ELECTROMAGNETIC TRANSDUCER HEAD

[75] Inventors: Shiro Hirai; Atsushi Nei; Kunihide Sakai, all of Yokohama, Japan

[73] Assignee: Victor Company of Japan, Limited, Yokohama, Japan

[21] Appl. No.: 2,564

[22] Filed: Jan. 11, 1979

[30] Foreign Application Priority Data

Jan. 13, 1978 [JP] Japan .................................. 53/1905

[51] Int. Cl.³ .............................................. G11B 5/14
[52] U.S. Cl. .................................. 360/125; 360/127; 29/603
[58] Field of Search ........ 360/119, 122, 125, 126–127; 428/611, 928; 148/12 EA, 100–101; 29/603

[56] References Cited

U.S. PATENT DOCUMENTS

| 3,810,245 | 5/1974 | Ozawa et al. ........................ 360/127 |
| 3,931,642 | 1/1976 | Kugimiya et al. .................... 360/122 |

FOREIGN PATENT DOCUMENTS

| 43-197 | 1/1968 | Japan ....................................... 360/127 |
| 43-198 | 1/1968 | Japan ....................................... 360/127 |

Primary Examiner—John H. Wolff
Attorney, Agent, or Firm—Lowe, King, Price & Becker

[57] ABSTRACT

An electromagnetic transducer head for a tape recording and reproducing system comprises a pair of generally U-shaped single crystalline ferrite cores having their first legs secured together and their second legs spaced from each other to form a magnetic gap in which a wafer of glossy material is provided. Each of the ferrite cores has crystal planes (211), (110) and (111). The magnetic gap is aligned to the crystal plane (111) and the second legs of the cores are shaped to provide a tape contact surface which is parallel with the crystal plane (211). The crystal plane (110) is at right angles to the planes (211) and (111) and forms a passage for magnetic flux. The crystallographic axis <110> of each core extends at an angle to the magnetic gap so as to meet the axis <110> of the other core at a point aligned with the tape contact face.

6 Claims, 8 Drawing Figures

ELECTROMAGNETIC TRANSDUCER HEAD

BACKGROUND OF THE INVENTION

The present invention relates to electromagnetic transducer heads for tape recording and reproduction, and more particularly to a single crystalline ferrite core magnetic head.

Single crystalline ferrite cores are known to exhibit magnetic anisotropy and because of their electromagnetic properties such ferrite cores find extensive use in video tape recorders as recording and reproducing heads. Although the prior art ferrite core possesses a comparatively high resistance to wear, the available output signal level, the optimum recording level and signal-to-noise ratio are not satisfactory to permit high-quality video recording and reproduction.

SUMMARY OF THE INVENTION

According to the invention, the magnetic head comprises a pair of generally U-shaped single crystalline ferrite cores, the first legs of both cores being in abutment to each other with an air gap between the confronting surfaces of the second legs of the cores. A spacer is fused between the confronting surfaces of the second legs. Each core possesses crystal planes (211), (110) and (111) which are at right angles to each other. The air gap extends in a plane which is parallel with the crystal plane (111) and the second legs of both cores are shaped to provide a tape contact surface which is aligned to the crystal plane (211). The first and second legs of each core form a common surface parallel with the crystal plane (110) which is made flush with the common surface formed by the first and second legs of the other core. The crystalline axis <110> of each core extends at an angle to the gap so as to meet the axis <110> of the other core at a point aligned with the tape contact surface.

Tests showed that the resistance to wear is comparable with that of the prior art head while the available output signal level, the recording signal level and signal-to-noise ratio are improved over the prior art device.

An object of the present invention is therefore to provide a magnetic ferrite core head which is superior to prior art ferrite heads in terms of output signal level, recording level and signal-to-noise ratio with a satisfactory degree of resistance to wear.

BRIEF DESCRIPTION OF THE DRAWINGS

The invention will be further described with reference to the accompanying drawings, in which.

DETAILED DESCRIPTION

Figure 1:
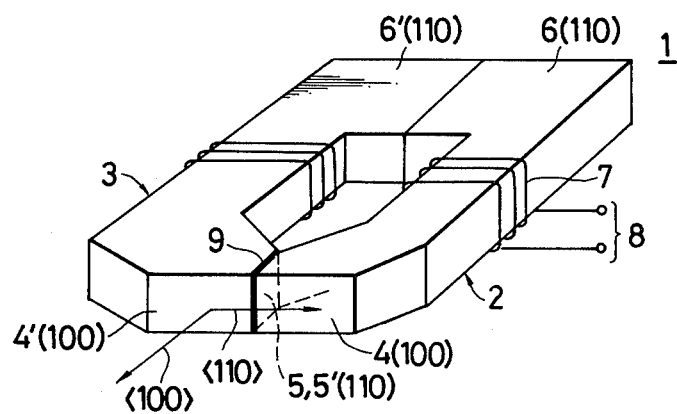
FIG. 1 is a perspective view of a prior art ferrite head.

Before describing the present invention, reference is first made to FIG. 1 in which an embodiment of a prior art magnetic head is illustrated. The prior art magnetic head 1 comprises a pair of generally U-shaped yokes or cores 2 and 3 formed of a single crystalline ferrite material with a positive magnetic anisotropic constant $K_1$. Each of these cores has its crystalline axes so oriented that planes (100) lie in the tape-contact surfaces 4 and 4', planes (110) lie in the confronting faces 5 and 5' in which a spacer 9 is secured, and planes (110) run parallel with faces 6 and 6' which are at right angles to both faces 4, 4' and 5, 5'. The easy axis of magnetization <110> extends normal to the plane (110). A coil 7 is wound on the cores 2, 3 as shown and connected to terminals 8.

Figure 2:
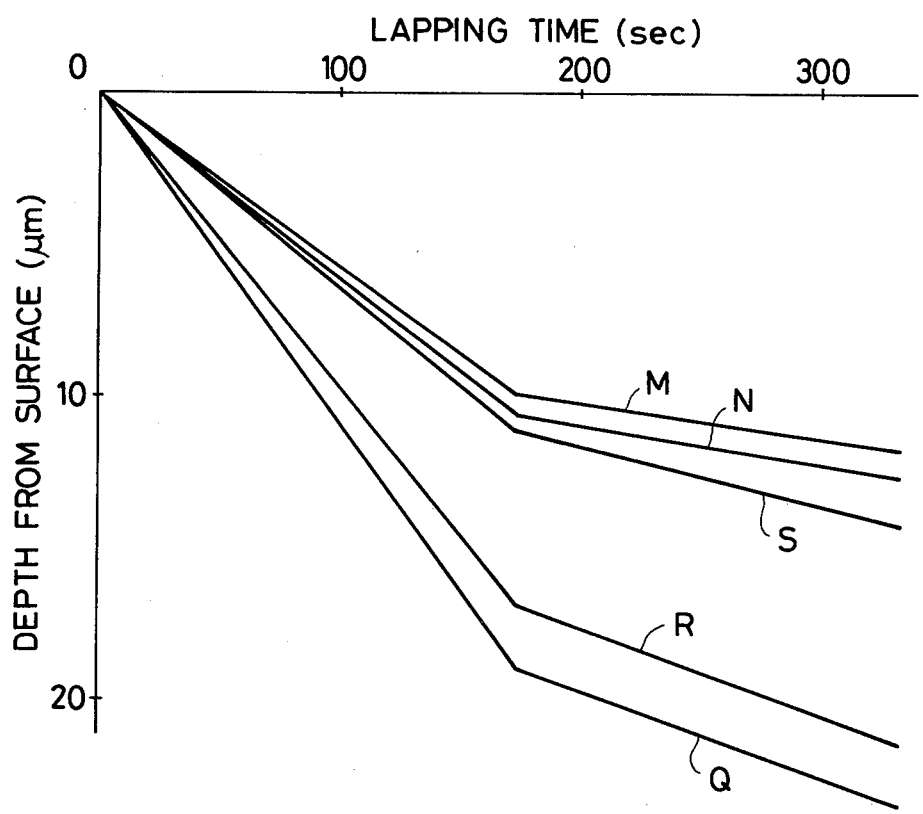
FIG. 2 is a graphic illustration of the wear resistance characteristic of the invention in comparison with those of other ferrite cores having different crystal plane orientations.
Figure 3:
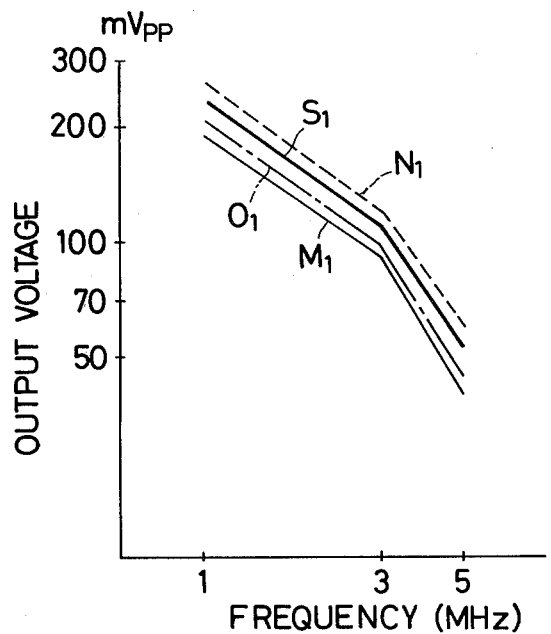
FIG. 3 is a graphic illustration of comparative data as to the transducer output voltage as a function of frequency.
Figure 4:
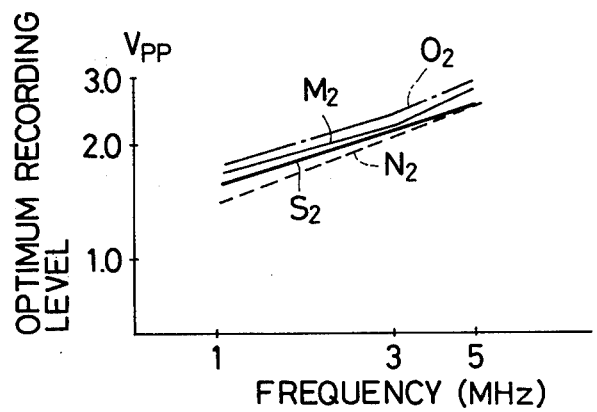
FIG. 4 is a graphic illustration of comparative data as to the transducer optimum recording level as a function of frequency.

This prior art magnetic head is comparatively resistant to wear as indicated by curve M of FIG. 2 which was obtained as a result of a test wherein the tape-contact faces 5, 5' are lapped by a lapping tape No. 8000 and the amount of wear was measured in terms of depth from the initial surface. However, the output voltage developed across termials 8 is comparatively small as indicated by a frequency response curve $M_1$, FIG. 3, and the voltage required to record is relatively high as indicated by curve $M_2$, FIG. 4, with a low signal-to-noise ratio. The low output voltage is accounted for by a relatively small magnetic resistance across the spacer 9, and hence the small leakage flux because of the orientation of the easy axis of magnetization <110> which is perpendicular to the spacer 9.

Figure 5:
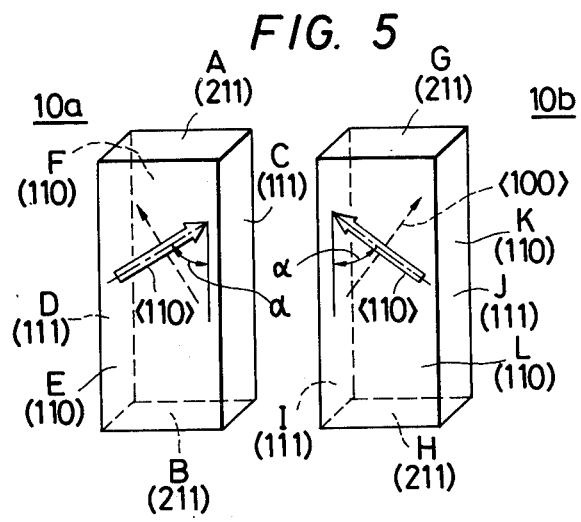
FIGS. 5 and 6 are perspective views of the electromagnetic transducer head of the invention.

Referring to FIGS. 5-8, embodiments of the present invention are illustrated. Single crystalline ferrite bodies with a positive magnetic anisotropic constant $K_1$ are shaped to provide two parallelpiped blocks 10a and 10b as shown in FIG. 5, whose crystalline axes <110> are skewed at an angle $\alpha(-55°)$ to the longitudinal axis of each body and parallel with the plane (110), with the crystal axes <100> being at right angles to the axes <110>. The ferrite blocks 10a and 10b have parallel opposite faces A, B and G, H, respectively which lie in the crystal plane (211), faces C, D and I, J lying in the plane (111) and faces E, F and K, L lying in the plane (110).

Figure 6:
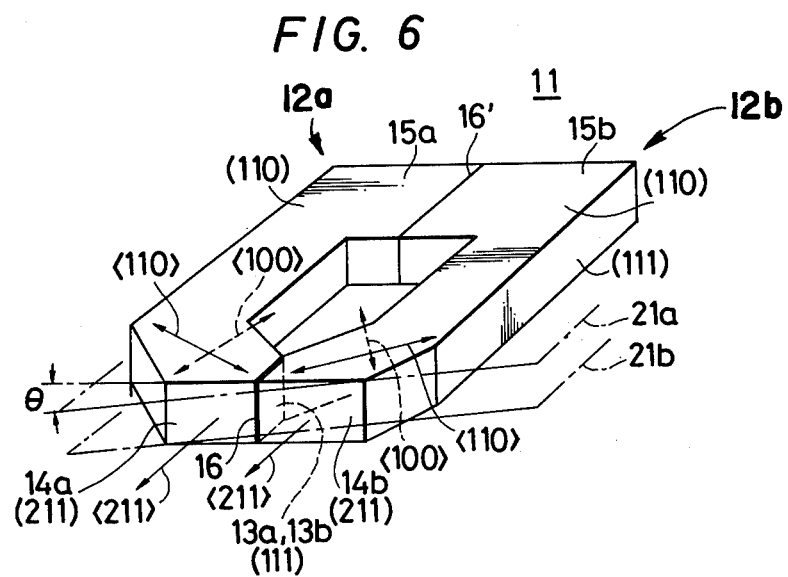

The blocks 10a and 10b are respectively shaped to provide generally U-shaped half cores 12a and 12b as shown in FIG. 6 which are secured together with their side faces 16, 16' lying in the crystal planes (111). A thin wafer or spacer 16 of glass is fused between the interfaces 16 to act as a magnetic gap. The easy axes of magnetization <110> extend from the inside of each leg of the U-shaped cores at an angle of 55° to the magnetic gap 16 and meet at a point on a tape contact face defined by faces 14a, 14b which are parallel with the planes (211), with the crystal axis <211> extending normal to the plane (211). The legs of each core defines a surface 15 which is made flush with the face 15 of the other core and parallel with the crystal plane (110).

It has been recognized in the past that there is a tendency of each of the glass and ferrite materials toward diffusing into the adjacent region of the other material during the fusion process if the crystallographic structure of such regions has been distorted by the previous surface polishing process. It is, however, found that the crystallographic structure on the plane (111) remains substantially unchanged in the presence of mechanical shocks, the confronting faces of the core legs across the spacer 16 are less liable to damage during such polishing process, so that diffusion of adjacent material is less likely to occur. Therefore, the crystallographic structure of the core adjacent to the magnetic gap 16 remains unchanged so that the effective permeability of the adjacent regions is not reduced from the value it has previously possessed. This ensures that the effective gap length can be made relatively small with the result that a relatively high output voltage is developed when the head is used to pick up signals from the magnetic tape, as indicated by a dot-line curve $N_1$ of FIG. 3. The optimum recording voltage is also small as indicated by a dot-line curve $N_2$ in FIG. 4. The video frequency signal-to-noise ratio and the voltage output performance of the magnetic head 11 are respectively 2dB greater than those available with the prior art head 1.

Figure 7:
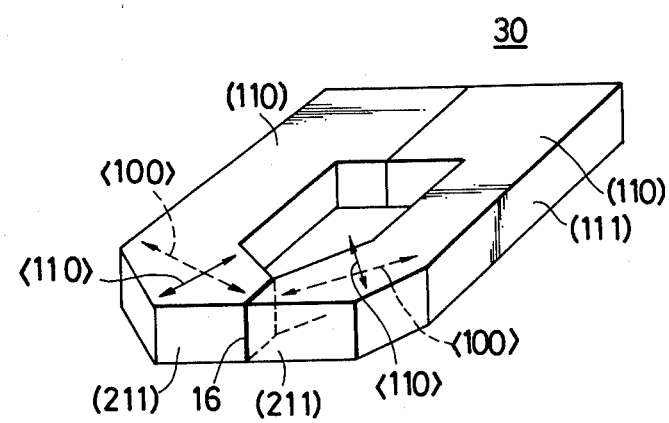
FIG. 7 is a perspective view of an experimental embodiment of the invention.
Figure 8:
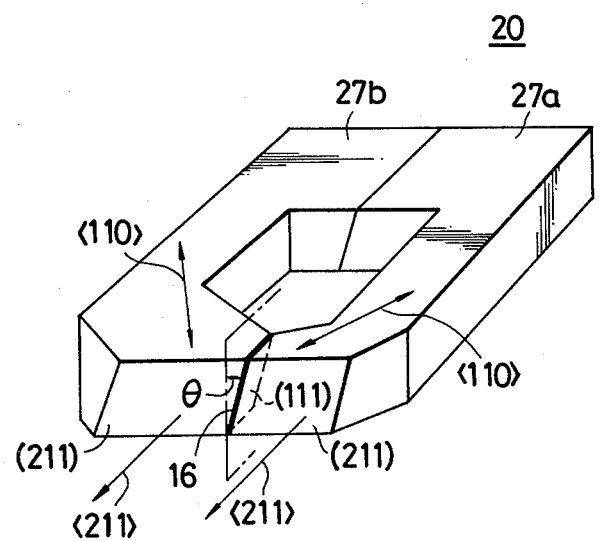
FIG. 8 is a perspective view of a further embodiment of the invention.

The easy axis of magnetization is known to correspond to the crystalline axis <100>. In the embodiment of FIG. 6 the axis <110> is the easy axis of magnetization. This is contrary to the known fact. The FIG. 6 embodiment is based on the assumption that the easy axis of magnetization has changed from the axis <100> to the axis <110> during the process of shaping the bodies 10a, 10b into the magnetic head. This assumption is verified by experimentally fabricating a magnetic head as shown in FIG. 7 which is similar to the magnetic head of FIG. 6 except that the axes <110> extend at right angles to the axes <110> of the FIG. 6 embodiment so that the axes <100>, which are the easy axes of magnetization prior to the fabrication, correspond to the axes <110> of the FIG. 6 embodiment. It appears at a first glance that, since the easy axis of magnetization <100> converges at the gap, the effective gap length may be smaller than the embodiment of FIG. 6 and the voltage developed may be higher than with the latter. However, tests showed that the output voltage derived from the magnetic head of FIG. 7 is smaller than with the FIG. 6 magnetic head as indicated by a chain-dot curve $O_1$, FIG. 3. The optimum recording voltage is relatively large as indicated by a chain-dot curve $O_2$ in FIG. 4. This is an indication that the new easy axis of magnetization is the axis <110>. Therefore, in the embodiment of FIG. 6 the axes <110> are the new easy axes of magnetization, and the axes <100> are the previous axes of easy magnetization.

Single crystalline ferrite material tends to develop distortion in the surface area of its crystallographic structure as a consequence of the sliding contact with magnetic tape. This crystallographically modified region of the ferrite core, while it becomes hardened so as to contribute to increase the resistance to wear, tends to degrade the magnetic properties of the core material and results in a so-called "spacing loss" which reduces its electromagnetic transducing efficiency.

Wear tests were conducted to ascertain the wear resistance of the magnetic head 11 of FIG. 6 by lapping the surfaces 14a and 14b with the lapping tape No. 8000. As indicated by curve N of FIG. 2 the wear resistance is substantially comparable to that of the prior art magnetic head of FIG. 1. In an electron diffraction analysis a distorted crystallographic mosaic pattern was observed on the surfaces 14a, 14b, rather than a complete halo pattern and even if a portion of the surface is etched away the distorted mosaic pattern was observed until the etched portion reaches a substantial depth from the original surface plane. The surfaces 14, 14b, even if they have been lapped over time during use, will not distort their adjacent crystal structures, so that trunsducing efficiency remains unchanged.

The ferrite bodies may also be cut so that their faces 21a, 21b are at an angle of $\theta$ (which is less than 10°) to the surfaces 15a, 15b. This results in a magnetic head 20, shown in FIG. 8, with the gap 22 being skewed $(90° - \theta)$ relative to the path of magnetic flux. The surface planes 27a, 27b thus make an angle $\theta$ to the crystal plane (110) and the side faces 28 are no longer parallel with the plane (111). Observation of an etchpit diagram on the faces 27 indicates that, when the angle $\theta$ is within 0° to 10°, the faces 27 do not lose their magnetic properties as the crystal plane (110) so that they can still serve as a principle magnetic flux path.

In order to ascertain the favorable characteristics of the present invention, three other magnetic heads are experimentally fabricated from single crystalline ferrite bodies in a similar manner to the embodiment of FIG. 6 with the following exceptions:

(1) The first experimental head has its tape contact face parallel to the crystal plane (111) with the plane (110) as a magnetic flux path. The wear resistance characteristic of this head is indicated by curve Q of FIG. 2, which is unfavorably compared with the characteristic of the present invention.

(2) The second experimental model was made with its tape contact face parallel with the plane (110), with the crystal plane (111) serving as a magnetic flux path. The wear characteristic is indicated by curve R, FIG. 2, which is compared unfavorably with the present invention.

(3) The third model was made with its tape contact face parallel with the crystal plane (211), with the crystal plane (111) serving as a magnetic flux path; the wear characteristic being indicated by curve S which is close to that of the present invention. However, the electromagnetic characteristics of the third model are indicated by curves $S_1$ and $S_2$ shown respectively in FIGS. 3 and 4, which are compared unfavorably with the present invention.

The magnetic head 11 of FIG. 6 can also be formed of a ferrite material with a negative magnetic anisotropic constant to achieve the same characteristics as mentioned previously in so far as the tape contact face is parallel with the crystal plane (211) with the crystal plane (111) parallel with the gap and with the plane (110) serving as a magnetic path.

In summary, the electromagnetic transducer 11 of the present invention comprises a pair of single crystalline generally U-shaped ferrite cores each having crystal planes (211), (111) and (110) which extend at right angles to each other. A coil is wound on the cores. The first legs of the U-shaped ferrite cores are in abutment with each other, the second legs of both cores being spaced from each other to form a gap between them. The gap extends in a plane which is parallel with the crystal plane (111) and the second leg of each core forms a tape contact face parallel with the crystal plane (211). The first and second legs of each core form a common surface which is flush with the common surface formed by the first and second legs of the other core, the common surfaces being parallel with the crystal plane (110). A spacer is fused between the confronting surfaces of the second legs of the cores. The crystallographic axis <110> of each core extends at an angle to the magnetic gap so as to meet the axis <110> of the other core at a point on the tape contact face.

What is claimed is:

1. An electromagnetic transducer head comprising a pair of single-crystalline ferrite half core elements each having crystal planes (211), (111) and (110) which are at right angles to each other, said core elements being secured together to form a magnetic circuit with a magnetic gap therein, said magnetic gap lying in a plane which is substantially parallel with said crystal plane (111), said core elements forming a tape contact face which is parallel with said crystal plane (211) and intersecting the plane of said magnetic gap at right angles, said core elements forming a common surface substantially parallel with said crystal plane (110), each of said core elements having a crystallographic axis <110> extending at an angle to the plane of said magnetic gap to intersect the crystallographic axis <110> of the other core element at a point lying in said tape contact face, and a coil wound on said magnetic circuit.

2. An electromagnetic transducer head as claimed in claim 1, wherein each of said core elements comprises a generally U-shaped ferrite core, the first leg of the U-shape of each core being secured to the first leg of the U shape of the other core and the second leg of each core being spaced from the second leg of the other core to form said magnetic gap, said first and second legs of each core forming a common surface which is flush with the common surface formed by the other core, said common surfaces being parallel with said crystal plane (110).

3. An electromagnetic transducer head as claimed in claim 1 or claim 2, wherein, a line perpendicular to the plane of said gap is inclined at an angle less than 10° to said common surface.

4. An electromagnetic transducer head as claimed in claim 1, wherein said angle is approximately 55°.

5. An electromagnetic transducer head as claimed in any one of claims 1, 2 or 4, further comprising a spacer of fused material provided in said magnetic gap.

6. An electromagnetic transducer head as claimed in any one of claims 1, 2 or 4, wherein said half core elements have a positive magnetic anisotropic constant $K_1$.

* * * * *